United States Patent
Santucci et al.

(10) Patent No.: US 10,850,802 B2
(45) Date of Patent: Dec. 1, 2020

(54) METHOD FOR MANAGING THE ENERGY RANGE OF AN ASSISTED PEDAL ELECTRICAL BICYCLE

(71) Applicant: PIAGGIO & C. S.P.A., Pontedera (IT)

(72) Inventors: Mario Donato Santucci, Pontedera (IT); Onorino Di Tanna, Pontedera (IT)

(73) Assignee: PIAGGO & C. S.P.A., Pontedera (IT)

(*) Notice: Subject to any disclaimer, the term of this patent is extended or adjusted under 35 U.S.C. 154(b) by 282 days.

(21) Appl. No.: 15/774,787

(22) PCT Filed: Oct. 18, 2016

(86) PCT No.: PCT/IB2016/056251
§ 371 (c)(1),
(2) Date: May 9, 2018

(87) PCT Pub. No.: WO2017/085579
PCT Pub. Date: May 26, 2017

(65) Prior Publication Data
US 2018/0319457 A1  Nov. 8, 2018

(30) Foreign Application Priority Data
Nov. 16, 2015 (IT) .......................... 102015000072821

(51) Int. Cl.
*B62M 6/55* (2010.01)
*B62M 6/90* (2010.01)
(Continued)

(52) U.S. Cl.
CPC ............... *B62M 6/55* (2013.01); *B60L 50/20* (2019.02); *B60L 50/66* (2019.02); *B62M 6/45* (2013.01);
(Continued)

(58) Field of Classification Search
CPC . B62M 6/55; B62M 6/45; B62M 6/50; B62M 6/90; B60L 50/66; B60L 50/20;
(Continued)

(56) References Cited

U.S. PATENT DOCUMENTS 4,280,581 A * 7/1981 Rudwick .................. B62M 6/90
                                                        180/206.5
9,302,734 B2 * 4/2016 Getta ....................... B62M 6/55
(Continued)

FOREIGN PATENT DOCUMENTS

| DE | 102014213504 B3 | 10/2015 |
| EP | 1295785 A1 | 3/2003 |
| EP | 2172740 A1 | 4/2010 |
| WO | WO2012/172227 A1 | 12/2012 |

OTHER PUBLICATIONS

International Search Report and Written Opinion for PCT/IB2016/056251 dated Dec. 23, 2016.

*Primary Examiner* — Tuan C To
(74) *Attorney, Agent, or Firm* — Cantor Colburn LLP (57) ABSTRACT

A management method for the energy range of a rechargeable battery pack of an assisted pedal electrical bicycle (1) including an electrical machine controllable for supplying a torque according to a pedal assistance factor, said torque being summed to the one generated by a cyclist through the pedaling, the management method including the following steps: a) selecting a route to be traveled by the electrical bicycle (1) starting from an initial position; b) obtaining data representative of the altitude profile of the selected route and dividing the route in a plurality of segments each being characterized by a respective altitude parameter; c) calculating a value correlated to the maximum percentage of battery pack (20) discharge on the selected route as a function of the altitude profile and of a limit pedal assistance factor K_limit, preferably calculating a value for each segment representative of the percentage of battery pack (20)

(Continued)

discharge on the segment as a function of a limit assistance factor K_limit associated to each segment based on the altitude parameter associated to the segment; d) verifying whether the battery pack (20) has a residual positive charge or not at N the end of the route; wherein, if following that step d) of verifying it is determined that the battery pack (20) does not have a residual positive charge at the end of the route, then the management method iteratively repeats the steps c) and d) modifying the limit assistance factor K_limit based on one or more adjustment curves each allowing to obtain a new limit assistance factor for each segment as a function of the segment slope.

6 Claims, 7 Drawing Sheets

(51) Int. Cl.
    *B62M 6/50* (2010.01)
    *B62M 6/45* (2010.01)
    *B60L 50/60* (2019.01)
    *B60L 50/20* (2019.01)
    *B60L 58/13* (2019.01)

(52) U.S. Cl.
    CPC ............... *B62M 6/50* (2013.01); *B62M 6/90* (2013.01); *B60L 58/13* (2019.02); *B60L 2200/12* (2013.01); *B60L 2240/12* (2013.01); *B60L 2240/20* (2013.01); *B60L 2260/54* (2013.01)

(58) Field of Classification Search
    CPC .. B60L 58/13; B60L 2200/12; B60L 2240/12; B60L 2240/20; B60L 2260/54
    USPC .......................................................... 701/22
    See application file for complete search history.

(56) References Cited

U.S. PATENT DOCUMENTS

| | | | | |
|---|---|---|---|---|
| 9,359,043 | B2* | 6/2016 | Huang | G01D 5/2451 |
| 10,232,736 | B2* | 3/2019 | Hamann | B60L 50/20 |
| 2003/0105562 | A1* | 6/2003 | Hsiao | B60L 58/40 |
| | | | | 701/22 |
| 2004/0201365 | A1* | 10/2004 | Dasgupta | H02J 7/34 |
| | | | | 320/116 |
| 2010/0018784 | A1* | 1/2010 | Hoebel | B60L 50/40 |
| | | | | 180/2.2 |
| 2010/0292914 | A1 | 11/2010 | Vepsalainen | |
| 2011/0202219 | A1* | 8/2011 | Ishibashi | B60L 11/1861 |
| | | | | 701/22 |
| 2011/0254673 | A1* | 10/2011 | Jean | B62M 6/45 |
| | | | | 340/432 |
| 2012/0038158 | A1* | 2/2012 | Chen | F03D 9/32 |
| | | | | 290/50 |
| 2012/0212161 | A1* | 8/2012 | Takeuchi | B60L 7/18 |
| | | | | 318/376 |
| 2013/0231810 | A1* | 9/2013 | Garcia | B60L 50/20 |
| | | | | 701/22 |
| 2014/0070930 | A1* | 3/2014 | Hara | B62J 99/00 |
| | | | | 340/432 |
| 2014/0229046 | A1* | 8/2014 | Gros | B60L 50/20 |
| | | | | 701/22 |
| 2016/0016630 | A1* | 1/2016 | Thompson | B62M 6/45 |
| | | | | 280/287 |
| 2016/0016633 | A1* | 1/2016 | Thompson | B62K 15/008 |
| | | | | 74/551.4 |
| 2016/0031506 | A1* | 2/2016 | Lloyd | G06F 13/4081 |
| | | | | 701/49 |
| 2016/0039496 | A1* | 2/2016 | Hancock | G01S 19/19 |
| | | | | 701/60 |
| 2016/0149417 | A1* | 5/2016 | Davis | H02J 7/045 |
| | | | | 320/162 |
| 2016/0214501 | A1* | 7/2016 | Yeom | B60L 58/25 |
| 2016/0375308 | A1* | 12/2016 | Anderson | G01S 19/19 |
| | | | | 482/5 |
| 2017/0291661 | A1* | 10/2017 | Lee | F16H 61/42 |

* cited by examiner

METHOD FOR MANAGING THE ENERGY RANGE OF AN ASSISTED PEDAL ELECTRICAL BICYCLE

CROSS-REFERENCE TO RELATED APPLICATION

This application is the 35 U.S.C. § 371 national stage application of PCT Application No. PCT/IB2016/056251, filed Oct. 18, 2016, where the PCT claims priority to and the benefit of IT Patent Application No. 102015000072821, filed Nov. 16, 2015, both of which are herein incorporated by reference in their entireties.

FIELD OF THE INVENTION

The present invention refers to the field of the assisted pedal electric bicycles and particularly concerns a method for managing the energy range of a pedal assisted electrical bicycle.

Particularly, it is a method for managing a bicycle having a powertrain unit, which, by collecting energy from a battery pack, according to suitable control schemes provides an assistance to the pedal that the cyclist is generating during the use of the bicycle through the pedaling.

KNOWN ART

As it is known, in the transportation field the electric or hybrid vehicles are always more successfully establishing themselves. Among those there are the pedal assisted electrical bicycles or EBIKES.

As it is known, the key factors for the success of those type of bicycle solutions are compactness, lightness, convenience, appealing appearance, reliability and, as well, low cost. Nevertheless, the pedal assisted electrical bicycles currently have still few improvement margins.

The electrical bicycles include at least a rechargeable battery pack adapted to power an electrical machine acting as an auxiliary powertrain generating a torque that is added to the one produced by the cyclist during the pedaling. To the rechargeable battery pack, it is generally associated an electronic system for monitoring the charge status of the battery pack and for managing the charge thereof, being defined battery management system.

In the pedal assisted electrical bicycles of the known art however it is difficult to manage the energy range of the bicycle related to the charge status of the battery, because the user generally can have only information related to the residual charge status of the battery available and can select a pedal assistance level among a plurality of levels (generally three: low, medium or high) in order to be able to try preserving the charge status, for example by avoiding selecting a high assistance level when the residual charge of the battery is nearly exhausted.

Therefore, the purpose of the present description is to make a solution available that is adapted to overcome, or reduce at least in part, the limitations of the above-described known art.

That purpose is achieved by means method for managing the energy range of an assisted pedal electrical bicycle as generally defined in claim 1. Generally, it is a management method for the energy range of a rechargeable battery pack of an assisted pedal electrical bicycle including an electrical machine controllable for supplying a torque according to a pedal assistance factor, said torque being summed to the one generated by a cyclist through the pedaling.

The management method including the following steps:
A) selecting a route to be traveled by the electrical bicycle starting from an initial position;
B) obtaining data representative of the altitude profile of the selected route and dividing the route in a plurality of segments each being characterized by a respective altitude parameter;
C) calculating a value correlated to the maximum percentage of battery pack discharge on the selected route as a function of the altitude profile and of a limit pedal assistance factor K_limit, preferably calculating a value for each segment representative of the percentage of battery pack discharge on the segment as a function of a limit assistance factor K_limit associated to each segment based on the altitude parameter associated to the segment;
D) starting from the calculation carried out in step C), verifying whether the battery pack has a residual positive charge or not at the end of the route;
wherein, if following the verification step D), it is determined that the battery pack does not have a residual positive charge at the end of the route, then the management method iteratively repeats the steps C) and D) modifying the limit assistance factor K_limit based on one or more adjustment curves each allowing to obtain a new limit assistance factor for each segment as a function of the segment slope.

Preferred and advantageous embodiments of the above-mentioned managing method are defined in the appended dependent claims.

The invention will be better understood from the following detailed description of a particular embodiment made by way of non-limiting example, referring to the attached drawings being synthetically described in the following paragraph.

DETAILED DESCRIPTION

Figure 1:
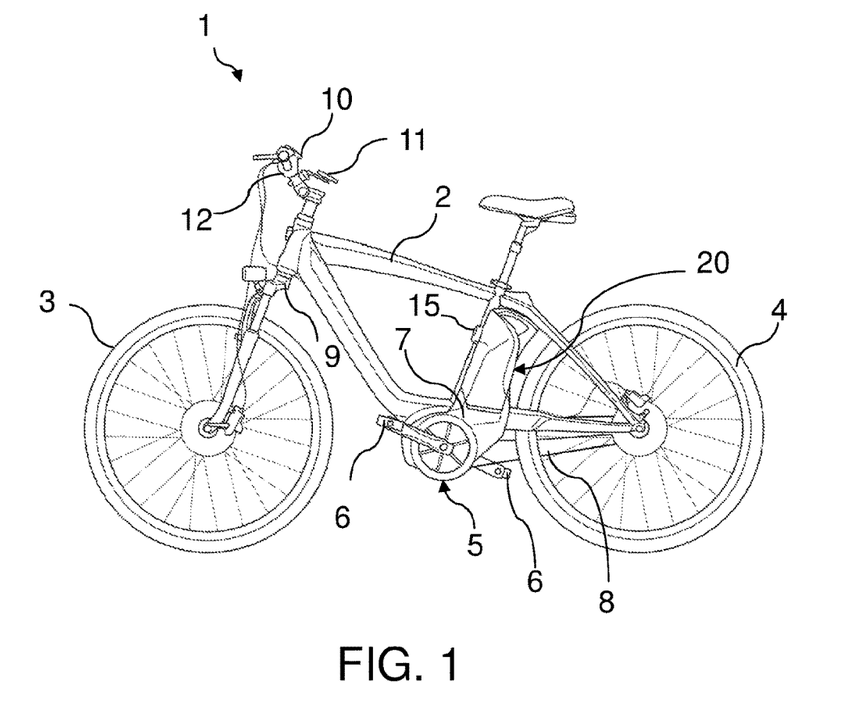
FIG. 1 shows a side view of a possible embodiment of an assisted pedal electrical bicycle.

Referring to FIG. 1, a vehicle 1 is depicted in it, which is, in the particular example being described, an electrical bicycle or better a pedal-assist bicycle (EPAC).

The bicycle 1 comprises a frame 2, a front wheel 3 and a rear wheel 4 being pivotally hinged to the frame 2. In a way being known per se, the front wheel 3 is pivotally hinged to a steering forecarriage 9 of the bicycle 1 being pivotally fastened to the frame 2. The bicycle 1 comprises handlebars 12 pivotally hinged to the frame 2 and rotationally integral with the front wheel 3.

The bicycle 1 includes a power train unit 5 including a chassis 7 being fastened to the frame 2, a couple of pedals 6 being fastened to a crankset pivot and an electrical machine 60. In the depicted example, the powertrain unit 5 is operatively connected to the rear wheel 4 by means of a chain transmission system 8. In the present description, it will be possible to refer to the electrical machine 60 also by calling it motor or electrical motor.

The bicycle 1 also comprises a rechargeable battery pack 20, comprising a chassis fastened to the frame 2 of the bicycle 1, being preferably removable and fastenable to the frame 2 by means of a mechanical fastening system 15, for example a lock and key one. In the present description, the rechargeable battery pack 20 will be also referred to by indicating it with the term battery.

According to one embodiment, the electrical machine 60 of the powertrain group 5 collects energy from the rechargeable battery pack 20, in the example in order to assist the pedaling, therefore acting as auxiliary powertrain.

The electrical machine 60 for example is a synchronous three-phase electrical motor with permanent magnets including a rotor and a stator. The stator includes a stator winding that for example can be supplied with three alternating currents I_u, I_v, I_w in order to cause the rotation of the rotor 16. Preferably, the stator winding is a star winding.

Figure 3:
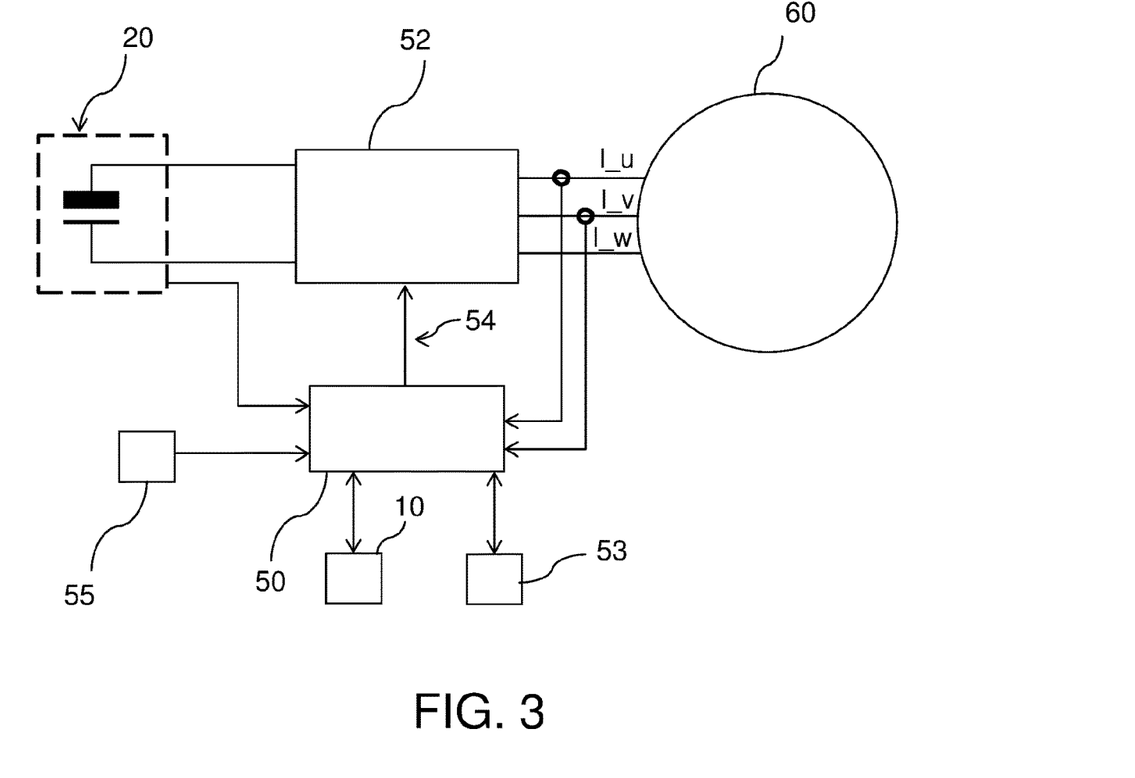
FIG. 3 shows a functional block diagram of an onboard electronic system of the bicycle of FIG. 1.

In FIG. 3 is shown a possible embodiment of an onboard electronic system included in the bicycle 1. The onboard electronic system includes a DC/AC converter 52 suitable to supply the electrical machine 60 and an electronic control unit 50 of the DC/AC converter 52. For example, the DC/AC converter 52 is such to provide three alternating currents I_u, I_v, I_w to the electrical machine 12. Preferably, the electronic control unit 50 includes a microcontroller. Preferably, the onboard electronic system of the bicycle 1 includes a pedaling sensor 55, for example being provided with at least one magnet and at least one Hall sensor, connected to the electronic control unit 50. The pedaling sensor is operatively connected to the electronic control unit 50 and allows measuring the speed and/or the frequency of the pedaling and providing those measurements to the electronic control unit 50. According to one embodiment, the pedaling sensor 55 allows also measuring the torque being applied by the cyclist to the pedals 6 during the pedaling.

The electronic control unit 50 is such to control the DC/AC converter 52 for example by means of a PWM control signal provided through the control line 54 so that the DC/AC converter 52 supplies the stator winding with alternating currents I_u, I_v, I_w.

According to one embodiment, the electronic control unit 50 is connected to the rechargeable battery pack 20 in addition to be supplied, for example by the interposition of a suitable voltage regulator, also to detect the charge status of the rechargeable battery pack 20.

Figure 2:
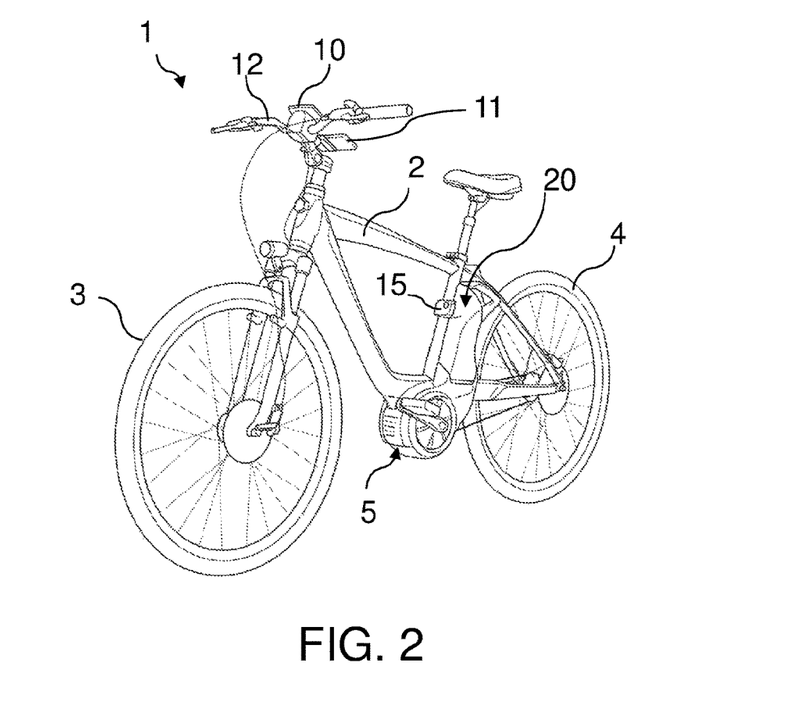
FIG. 2 shows a tridimensional view from the front side of the bicycle of FIG. 1.

According to one embodiment, the onboard electronic system of the bicycle 1 includes a radio communication interface 53, for example, a Wi-Fi or Bluetooth communication interface that allows connecting the onboard electronic system to a mobile personal communication device such as for example a smartphone or a tablet-pc provided with data connectivity. Referring to FIGS. 1 and 2, in this embodiment the bicycle 1 can include a support and fastening bracket 11 for a smartphone or a tablet-pc being fixed to the handlebars 12.

Additionally or alternatively, the onboard electronic system includes a radio communication interface, for example, a GSM, or UMTS, or 4G or LTE interface adapted to connect the onboard electronic system to a cellular radio network of a telecommunications operator.

According to one embodiment, the bicycle 1 includes a removable dashboard 10 being logically paired to the onboard electronic system and for example, adapted to provide a signal with an authentication code to the onboard electronic system. The above-mentioned removable dashboard 10 for example is removably fastened to the handlebars 12, for example on a dedicated anchoring station fastened to the handlebars 12. The removal of the dashboard 10 causes the absence of the authentication signal and therefore is such to signal to the electronic control unit 50 that the bicycle is in a parking status. Starting from that state, the coupling to the bicycle 1 of a dashboard 10 being not logically paired to the onboard electronic system does not cause the detection of the switching from the parking state to the authorized use state but the permanence in the parking state or the detection of the switching to a further state, for example to the alarm state being representative of a theft attempt. Alternatively or additionally to the removable dashboard 10, it is possible to envision that the above-mentioned signal with the authentication code is provided by a portable personal communication device, such as for example a smartphone or a tablet-pc logically paired to the onboard electronic system.

During the operation, the electronic control unit 50 controls the DC/AC converter 52 so that it provides supply currents to the electrical machine 60, which allow the electrical machine 60 to deliver a torque corresponding to a required assistance level. Preferably, the above-mentioned control is of a sensorless type, i.e. it does not require a rotor position sensor and for example, it is a closed loop control based on the back electromotive force estimation starting from the supply currents I_u, I_v, I_w of the electrical machine 60.

Now, it will be described a method for managing the energy range of the battery of an electrical bicycle for example of the above-described type. That management method can be executed exclusively by means provided onboard the bicycle 1, for example through the dashboard 10 and by the electronic control unit 50 and/or partially by means provided onboard the bicycle 1 and partially by external means, such as for example through a smartphone or a tablet-pc being operatively connectable to the onboard electronic system of the bicycle 1. In that case, an application program (or APP) onboard the smartphone or the tablet-pc is such to interface with the electronic control unit 50 for example through the radio communication interface 53.

The above-mentioned management method allows guaranteeing an ideal discharge profile of the battery along a route, by optimizing the discharge profile based on the altitude profile of the route. With a real-time management of the pedal assistance provided by the electrical motor 60, it is possible to ensure that the purpose is achieved with the minimum impact on the perception of the effort by the cyclist.

The management method includes a step of selecting a route to be traveled with the bicycle 1 starting from a given position, defined as initial position. Based on what described above, it is possible to understand that the selection can be carried out by a cyclist through the dashboard 10, which for example is provided with a display having a touchscreen interface or through keyboard, and/or through a smartphone or a tablet-pc, for example through an application program (or APP) of the type described above. In such selection step, for example it is possible to set some intermediate points with the possibility of automatically having the calculation of the "round-trip" as well.

The management method also includes a step of obtaining data being representative of the altitude profile of the selected route (herein also called itinerary) with a given resolution (for example equal to 100 m or 200 m) in order to divide the route in a plurality of segments each being characterized by an altitude parameter (such as for example the average altitude, or the initial altitude and the final one, etc.) and for example it is such to store the obtained data in one array correlating each segment (for example, being identified by initial and final distance from the initial position) to the related altitude parameter. Data representative of the altitude profile can be obtained for example from a remote server or can be obtained from maps loaded on the smartphone or the tablet pc or on the onboard electronic system of the bicycle 1.

The management method also includes a step of calculating the slope of each segment i, for example the average percent slope of each segment i, according to the following formula:

$$\Delta H \%_i(S) = \frac{(H_{i+1} - H_i) * 100}{(S_{i+1} - S_i)}$$

Wherein S is the distance of each point from the initial position calculated along the itinerary and H is the height for each point. Preferably, having to work by differences, the last point will be without a slope, but that do not significantly affect the calculation, as it is shown in the following.

Figure 4:
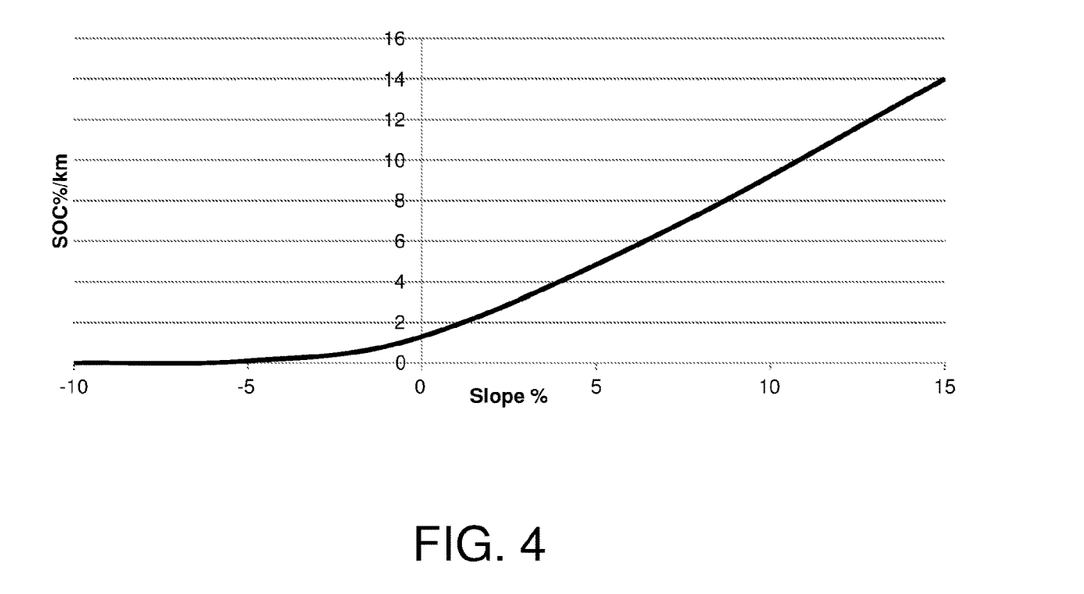
FIG. 4 shows a plot tracing the evolution of the profile of maximum percentage discharge per kilometer SOC %/km of the battery as a function of the slope.

There is defined a maximum discharge curve as a function of the slope, deciding the maximum consumption of the battery pack 20 by the bicycle 1. That curve can be represented by an array $SOC\_km_{max}(\Delta H \%)$ having a certain number of values (for example 6) being interpolated on the break points and a reference evolution equal or similar or analogous to that shown in FIG. 4. For example, the maximum discharge curve, for example being defined in terms of maximum percent discharge per kilometer as a function of the percent slope, is a reference curve being empirically estimated by correlating a percent discharge of the battery pack for each kilometer travelled as a function of the slope.

The management method also includes a step of calculating a value being correlated to the maximum discharge percentage of the battery pack 20, such as for example the maximum discharge percentage or the minimum residual value of the charge at the end of the itinerary or the minimum percent value of maximum discharge, on the selected route as a function of the altitude profile and of a limit pedal assistance factor K_limit, for example by calculating for each segment a value being representative of the discharge percentage of the battery pack 20, for example the discharge percentage, as a function of a limit assistance factor K_limit being associated to each segment based on the average percent slope, preferably based on the formulas shown in the following. The limit assistance factor K_limit for example is an input value selected by the cyclist or a system-preset value, being fixed or variable as a function of the slope of each segment. The purpose of the management method is to find a limit assistance factor and to make one or more corrections to that factor, during the initial setup step, but preferably also with real-time adjustments during the pedaling, which allow traveling the route depending on the charge status of the battery.

For example, for each segment i, the management method is such to calculate the maximum discharge percentage on the segment based on the formula:

$$\Delta SOC \%\_MAX_i = \frac{W + Wbike}{75 + Wbike} * SOC\_km_{max}(\Delta H \%_{i-1}) * (S_i - S_{i-1})$$

wherein W is the driver's mass expressed in kg and Wbike is the bicycle mass expressed in kg (the multiplying coefficient (W+Wbike)/(75+Wbike) is used to adapt the curve being detected in standard conditions with a reference driver of 75 kg to the specific use case), in order to calculate the minimum percent value of the charge status at the end of the route based on the following formula:

$$SOC \%_{min} = SOC_{init} - \Sigma \Delta SOC \%\_MAX_i$$

wherein $SOC_{init}$ represents the initial charge status of the battery pack 20, for example as measured by the electronic control unit 50.

The management method also includes a step of verifying whether said value correlated to the maximum discharge percentage of the battery pack 20 on the route, such as for example the above-mentioned minimum percent value of maximum discharge at the end of the itinerary, is a positive or negative value, or generally evaluating whether the battery pack 20 has a positive residual charge at the end of the itinerary.

If that value is positive, one can suppose that the management method consents to carry out the pedal assistance based on the limit assistance factor K_limit associated to each segment, only to possibly iteratively carry out the above-mentioned verifying step in real-time and periodically along the entire itinerary.

Figure 5:
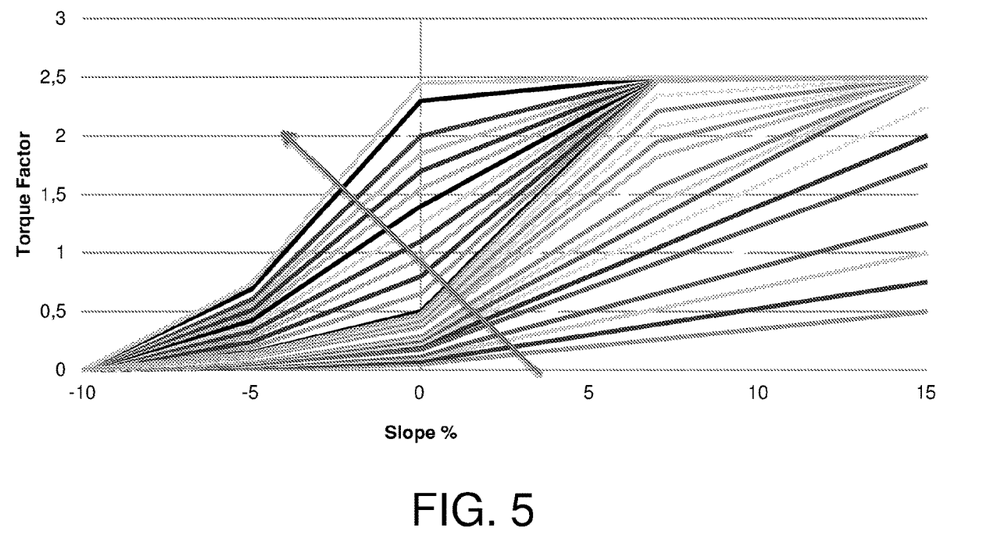
FIG. 5 shows a plot tracing a plurality of correction curves of the pedal assistance factor as a function of the slope.

On the contrary, if that value is negative, the management method is such to execute again the above-mentioned verification step modifying the limit assistance factor K_limit based on one or more correction curves, each allowing to obtain a new limit assistance factor for each segment i as a function of the segment slope. Preferably, those curves are bilinear curves with a saturation towards increasing slope values. For example, a set of possible correction curves is shown in FIG. 5. For example, those correction curves are defined by the expression:

$$K\_limit = MAX(0; MIN(2.5; IF(\Delta H\% \geq 0; 0.3003*\Delta H\% + 0.5; 0.07*\Delta H\% + 0.5)*K\_GIA))$$

wherein K_GIA for example is a correction coefficient being variable from a minimum value (for example 0) to a maximum value (for example 10) based on a given resolution (for example 0.1). The arrow in FIG. 5 shows how the correction curves vary as a function of increasing values of the coefficient K_GIA.

According to one embodiment, the management method is such to iteratively vary the correction curves, for example by varying the correction coefficient K_GIA, until the above-mentioned verification step allows establishing that the battery pack 20 has a positive residual charge at the end of the selected route.

In the following, preferred and non-limiting strategies will be described, which allow further improving the performances of the above-described management method.

According to one embodiment, in order to be able to calculate the discharge profile as a function of the constrains being imposed on the limit assistance factor K_limit, hypotheses can be decided about the cyclist's behavior in case of reduction of the torque being supplied by electrical motor 60 with respect to the case of the maximum assistance.

Figure 6:
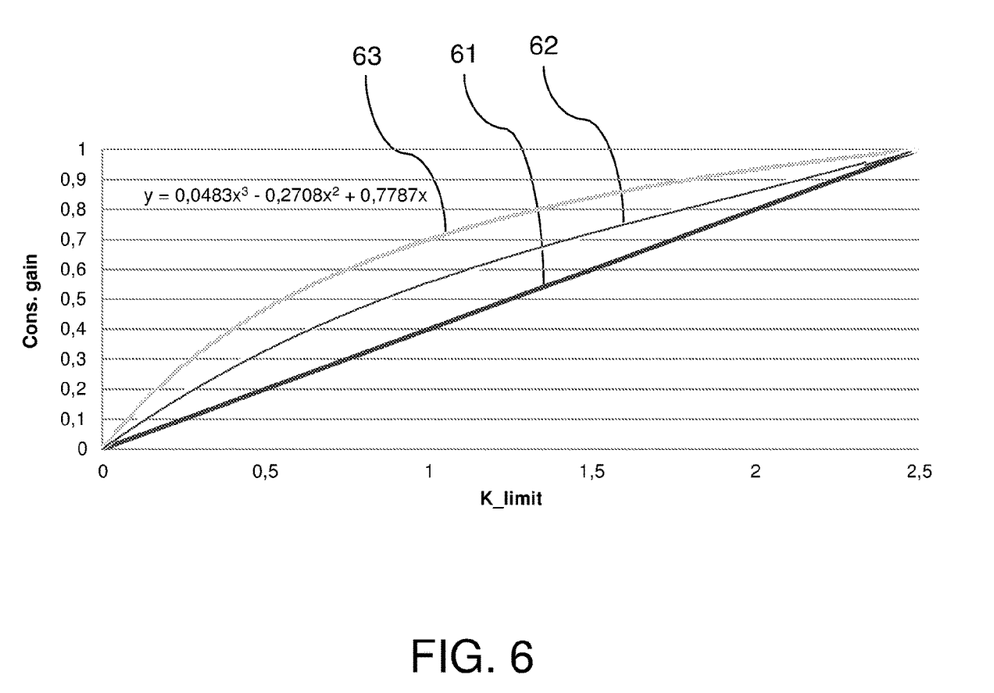
FIG. 6 shows a plot tracing a first coefficient of consumption reduction, and therefore of reduction of the assistance factor, as a function of the pedal assistance factor K_limit.

In FIG. 6 there are reported the evolutions of a first coefficient of consumption reduction "Cons. gain" or "SOC_gain" with respect to the reference consumption curve (1=no reduction or relatively low reduction–curve 63; 0.5=halved consumptions or relatively high reduction–curve 61) depending on the variation of the assistance factor K_limit according to two possible cyclist's reactions about the pedaling management:

1—The cyclist keeps constant the total power being supplied by the system by increasing his/her quota to compensate the reduction of electrical torque supplied by the motor 60;
2—The cyclist does not vary his/her work conditions by keeping constant his/her energy consumption with a consequent reduction of the bicycle performances.

In reality, it is foreseeable that the cyclist can assume both behaviors, depending on how near is to his/her physical limit, by moving towards case 2) during the hardest climbs and towards case 1) during the level ride.

Since it is not possible to decide in the setting step what the prevalent evolution will be, it is deemed to be suitable to average (curve 62) between the two above-described profiles with any discrepancy that will be compensated by the management method during the ride.

The equation underlined in FIG. 6 analytically expresses the average curve (curve 62) for the estimation of the reduction of the energy consumption with respect to the maximum value, i.e. the so-called first coefficient of consumption reduction SOC_GAIN, as a function of the punctual assistance factor K_limit being used:

$$SOC\_GAIN = MIN(1; 0.0483*K\_limit^3 - 0.2708*K\_limit^2 + 0.7787*K\_limit)$$

therefore, the estimated energy consumption for each segment during the execution of the management method and the charge status at the end of the route are expressed respectively by the formulas:

$$\Delta SOC\ \%\_GIA_i = \Delta SOC\ \%\_MAX_i * SOC\_GAIN_i$$

$$SOC\ \%\_GIA\_FINAL = SOC_{init} - \Sigma \Delta SOC\ \%\_GIA_i$$

By iteratively modifying the factor K_GIA, the management method (within a certain tolerance) finds the highest value guaranteeing a charge status SOC %_GIA_FINAL greater than zero at the end of the selected route. Preferably, in order to guarantee a minimum level of performances, K_GIA cannot assume values less than 0.4; in case neither that value can guarantee to complete the set itinerary, the management method includes a step of warning the cyclist with a message showing the maximum number of possible kilometers (with the minimum recommended assistance level) before fully discharging the battery pack 20.

According to one advantageous embodiment, starting from the value identified during the iterative process, the cyclist can further customize the performance target by acting on a continuous slider that modifies the assistance level (MAX–MIN), for example through the application program being executed on a smartphone or a tablet pc. The action on the slider manages the factor "K_GIA" and the management method consequently calculates the corresponding SOC %_GIA_FINAL.

The latter value preferably is converted in kilometers of residual range (RANGE_GIA_FINAL) by multiplying it by the estimated average consumption along the selected route and it is shown next to the selection slider, wherein the residual range is expressed as a distance in km by the formula:

$$RANGE\_GIA\_FINAL = \left(\frac{SOC_{init} - SOC\ \%\_GIA\_FINAL}{\Sigma S_i}\right)^{-1} * SOC\ \%\_GIA\_FINAL.$$

According to one embodiment, it is possible to envision that the management above-described method executes the above-described steps in a general setup step at the end of which the management method includes a storing step to save:

the value K_GIA to be used as setup of the real-time management method;
the discharge profile SOC %_GIA[N], whose elements represent the ideal charge status of the battery as a function of the itinerary progression.

Figure 7:
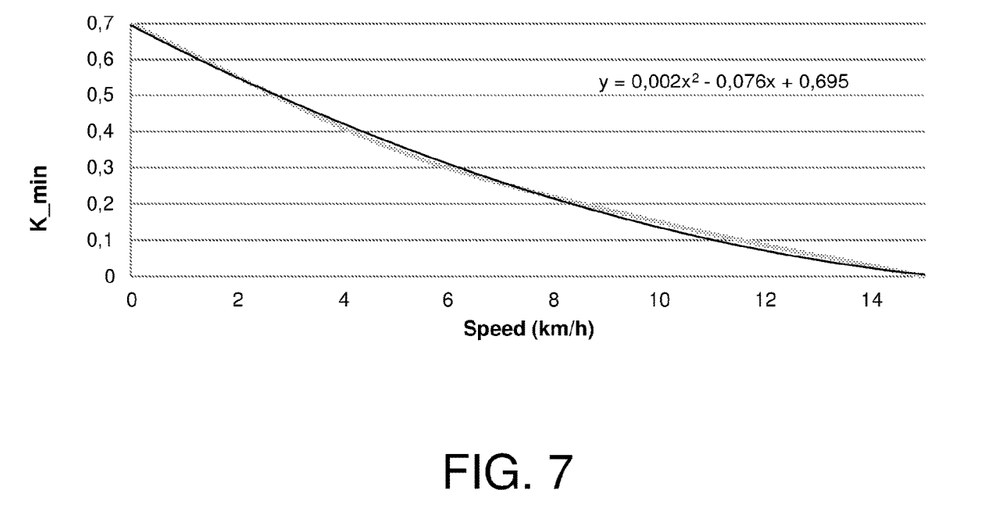
FIG. 7 shows a plot tracing the evolution of a minimum assistance factor K_min to be guaranteed as a function of the bicycle speed.

According to one embodiment, it is possible to envision that, after the above-mentioned general setup step, during the real-time riding of the bicycle 1, the management method executes the following sub-steps (operations):

Initializing the assistance factor K_limit at 1.5; and from the second iteration on:
Integrating the speed signal being sent by the bicycle 1 in order to obtain the displacement S;
Identifying the estimated slope ΔH % by reading without interpolation the array ΔH %(S) identified in the setup step;
Calculating the reference value for the pedal assistance factor (that can be defined as torque multiplying factor) K_limit as a function of K_GIA and ΔH % and applying a first order low-pass filter having a cut-off frequency around 0.1 Hz obtaining the variable K_limit_filt;
Identifying the ideal charge status corresponding to the actual displacement by interpolating the array SOC %_GIA(S);
Calculating the difference (SOC %$_{err}$=SOC %–SOC %_GIA(S)) between the effective charge status of the battery 20 and the ideal one;
Calculating the torque multiplying factor to be sent to the motor control K_rt according to the following formula:

$$K\_rt = MAX(Sat\_low(v), MIN(2.5, K\_limit\_filt + \Delta K\_rt\_filt))$$

where ΔK_rt_filt represents the result of a low-pass filter having an indicative cut-off at 0.05 Hz of the variable ΔK_rt being calculated as $$\Delta K\_rt = K\_rt_{old} * SOC\,\%_{err} * \text{Gain}$$

wherein K_rt$_{old}$ is clearly the torque multiplying factor at the previous calculation step and Gain adjusts the recovery speed of the error by the control and assumes for example, for the specific case indicative values between 0.3 and 0.5, and wherein Sat_low(v) instead is a saturation function that guarantees a minimum assistance level as a function of the speed in order not to disadvantage the spurt steps of the bicycle 1 too much also in case of high reduction coefficients being imposed by the strategy (one possible evolution is reported in FIG. 7).

Sending the calculated value for K_rt to the electronic control unit 50, which uses it to suitably multiply the torque value required by the cyclist according to an internal logic keeping all the safety and limiting strategies usually in place with priority with respect to what required by the above-mentioned management method.

According to one embodiment, in order to further improve the efficacy of the above-described management method, it is possible to introduce a further multiplying factor, or a second reduction coefficient of the pedal assistance factor (or torque multiplying factor), in series with respect to the first coefficient SOC_GAIN being identified by a decreasing function of the instantaneous energy consumption of the bicycle 1 or the average torque on the pedal 6. In that way, it is possible to achieve the goal of disadvantaging the cyclist as little as possible during the steps where a high physical effort is detected.

Figure 8:
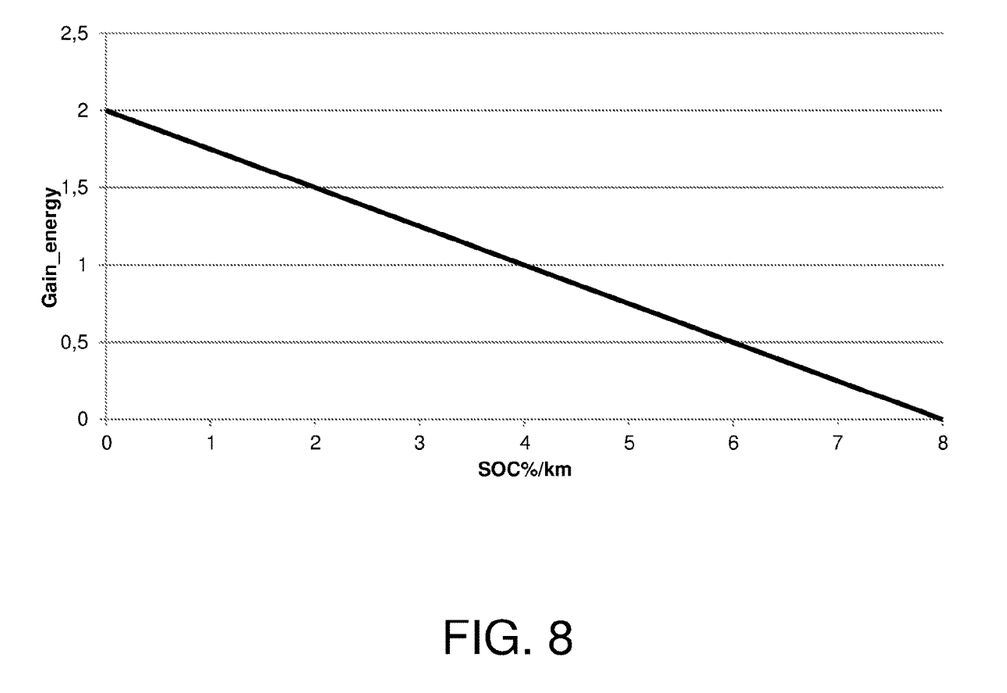
FIG. 8 shows a plot tracing a second coefficient of consumption reduction, and therefore of reduction of the assistance factor, as a function of the energy consumption of the bicycle battery.
Figure 9:
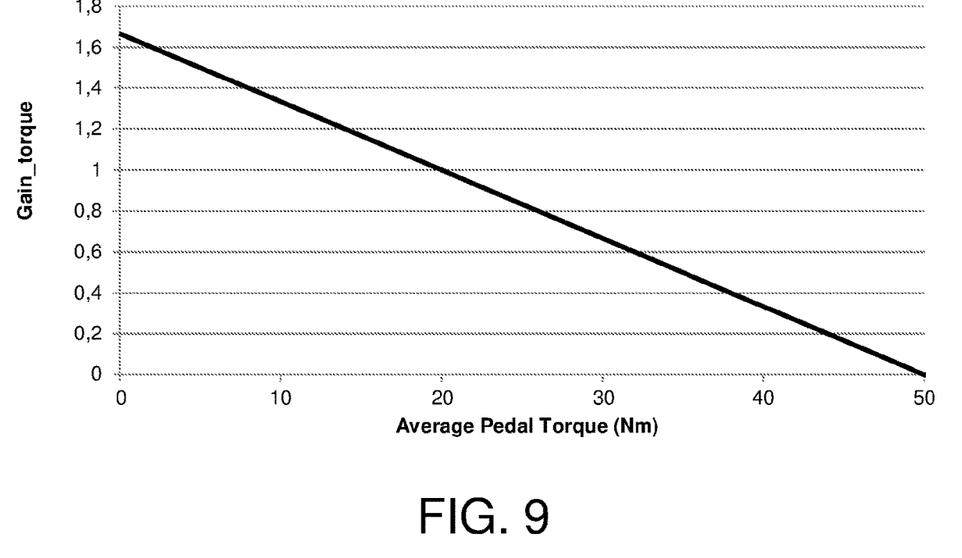
FIG. 9 shows a plot tracing a third coefficient of consumption reduction, and therefore of reduction of the assistance factor, as a function of the average torque being applied to the pedals.

Possible examples for the evolution of the two coefficients (to be used one as an alternative of the other) are reported in the FIGS. 8 and 9.

Figure 10:
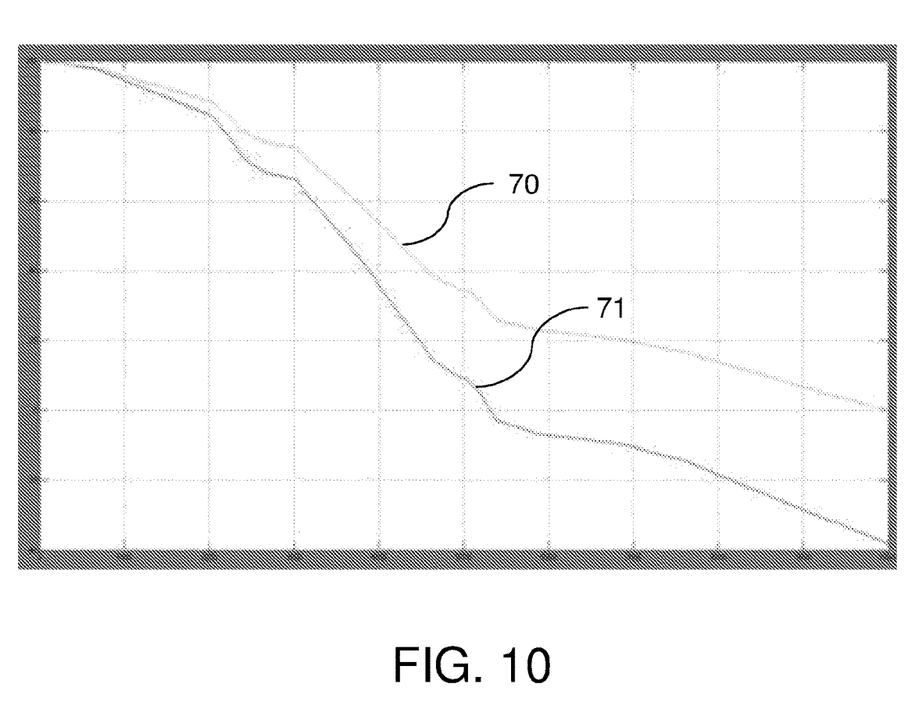
FIG. 10 shows two curves corresponding to a theoretical discharge profile and an effective discharge profile.

In FIG. 10 is reported the discharge profile with respect to the reference curve (curve 70) for a management method without real-time assistance in case during the pedaling significant variations of the energy consumption occur with respect to what envisioned in the setup step (wrong slope estimation, greater torque required by the user, errors in the definition of the consumption curve, etc.). As predictable, the charge status is very different from the expected one and that leads to null the energy in the battery already half the route decided by the user.

Figure 11:
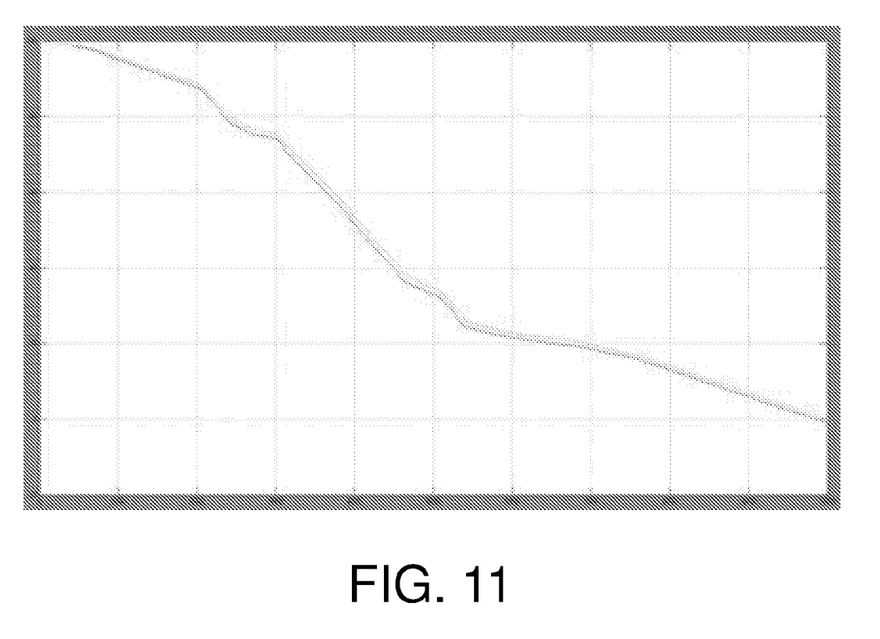
FIG. 11 shows two further curves corresponding to a theoretical discharge profile and an effective discharge profile.

On the contrary, the use of the punctual management of the assistance factor, for example as described in the paragraph [0060], allows (FIG. 11) progressively but effectively compensating the inevitable variations trying as much as possible to limit the impact of the user's perception.

The above-described management method can be defined as a management method according to an automatic operating mode. That operating mode for example can be one of a plurality of different operating modes being selectable by the cyclist.

Among these, for example an operating mode called "standard" can be provided. In that operating mode, the pedal assistance factor "K" being required to the electrical machine 60 is constant and herein it is called K$_{standard}$ and preferably it depends only on any intrinsic limitation during the operation (over-temperature, excessive discharge, speed limiter). K$_{standard}$ for example is expressed by the following relationship as a function of the required assistance level (Level):

$$K_{standard} = 0.25 * \text{Level}$$

Wherein Level represents a positive number ranging from 1 to 10 being selectable by the cyclist, with a resolution as desired, for example equal to 1 or 0.5.

Among the above-mentioned operating modes, for example, an operating mode called "City" can be provided, additionally or alternatively to the "standard" operating mode, being intended for a main use over urban routes. In the City operating mode an assistance factor herein called K$_{city}$ is implemented, which is high at low vehicle speed and gradually decreasing as approaching a limit speed, such as for example the speed defined by the present regulatory limit of 25 km/h.

Using the same concept of the previous case for the variable Level, the assistance factor K$_{city}$ can be expressed by the following formula as a function of the vehicle speed Speed in km/h:

$$K_{city} = \text{MIN}(2.5;\ (0.0005 * \text{Speed}^2 - 0.0276 * \text{Speed} + 0.5) * \text{Level})$$

Figure 12:
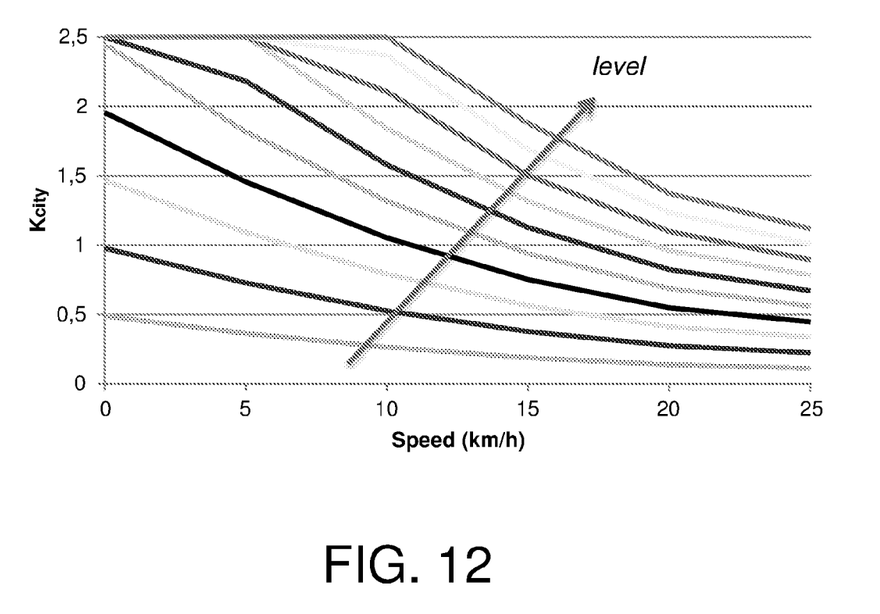
FIG. 12 shows curves of a pedal assistance factor as a function of a coefficient level and as a function of the speed, in one operative mode called "City".

An example of possible evolutions of the pedal assistance factor K$_{city}$ as a function of the speed and the variable Level is shown in FIG. 12.

Among the above-mentioned operating modes, for example, an operating mode called "Hill Assist" can be provided, additionally or alternatively to the "standard" operating mode and/or the "City" operating mode, being intended for a main use over routes having altitude variations, for example over hill routes. The operating mode "Hill Assist" is configured in order to guarantee an always increasing assistance as a function of the pedal torque being exerted by the cyclist so as to emphasize the performances in the heaviest conditions (sprints, hills, restarts).

The relative assistance factor, herein called K$_{hill}$, can be analytically expressed as follows:

$$K_{hill} = \text{MIN}(2.5;\ (0.2 * T_{pedal}) * (4/99 * \text{Level}^2 + 95/99))$$

wherein T$_{pedal}$ is the pedal torque (for example suitably filtered) expressed in Nm.

Figure 13:
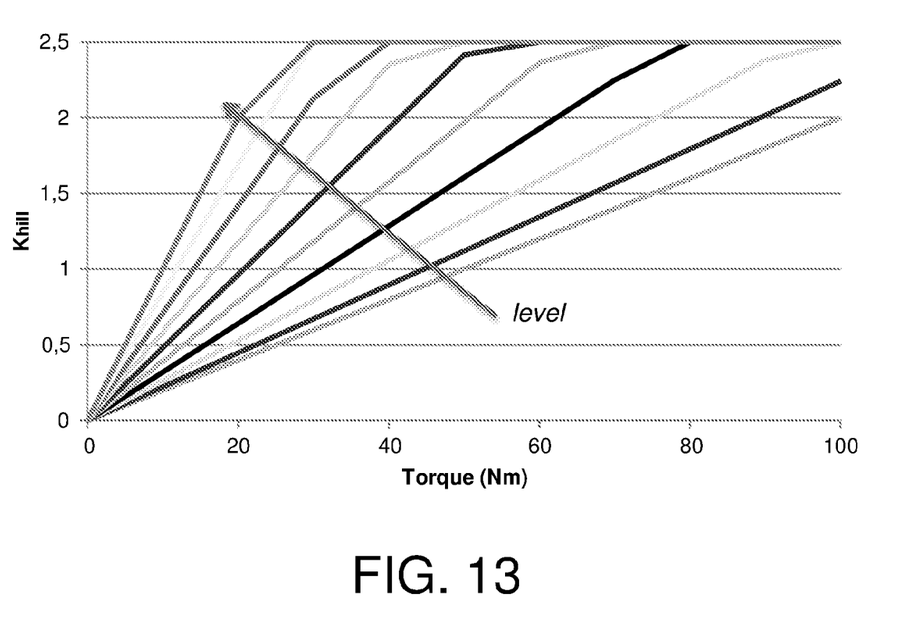
FIG. 13 shows curves of a pedal assistance factor as a function of a coefficient level and as a function of the torque, in one operative mode called "Hill Assist".

Few examples of possible evolutions of the pedal assistance factor K$_{hill}$ as a function of the speed and the variable Level is shown in FIG. 13.

Moreover, among the above-mentioned operating modes, for example, additionally or alternatively to the operating mode "Standard" and/or the operating mode "City" and/or the operating mode "Hill Assist", a mode called Fitness can be provided.

In that operating mode, for example the user at any time can select a value of target power P$_{target}$ through a slider, for example through the APP (possibly discretized over preset levels).

The management method, for example through the above-mentioned APP, executes the following operations in order to try to keep the power being applied to the pedals as near as possible to the selected value:

calculating the instantaneous power (in Watt) being provided by the user as a product between the pedal torque in Nm and the pedaling cadence in rpm:

$$P_{user} = T_{pedal} * \frac{\text{Cadence}}{60} * \pi;$$

applying to P$_{user}$ a proper first order low-pass filter (cut-off frequency around 0.5 Hz) obtaining the variable P$_{user\_filt}$;

as a function of P$_{target}$, calculating a reference assistance factor K$_{feed}$ according to the following formula:

$$K_{feed} = \text{Max}\left(0; \text{Min}\left(2.5; \frac{P_{ref} - P_{target}}{P_{target}}\right)\right)$$

where $P_{ref}$ represents the reference advancing power for the bicycle 1 on a level road as a function of speed and mass according to the formula:

$$P_{ref} = f_w * \text{Mass} * V + f_s * V^3$$

wherein V is the advancing speed of the bicycle in km/h, Mass represents the vehicle plus driver mass in kg (for example being set through the APP) and $f_w$ and $f_s$ are due multiplying coefficients being experimentally identified (reference values can be, respectively, 0.07 and 0.4).

The effective assistance value $K_{fit}$ is equal to the algebraic sum of $K_{feed}$ and a term being proportional to the error $P_{user\_filt} - P_{ref}$ through the factor $\text{Gain}_{fit}$, being possibly further filtered through a low-pass filter having an indicative cut-off around 0.2 Hz.

In order to avoid excessive limitations, at least during the spurt step, $K_{fit}$ has a lower saturation to a minimum value similar to what decided for the management method in the automatic mode referring to the lower saturation curve of FIG. 7 (it remains the usual higher limit with the maximum assistance factor being manageable by the motor, in the specific case equal to 2.5).

Without losing generality, the power target $P_{target}$ can be conveniently replaced by an analogous target of heartbeat $H_{target}$ expressed in beats for minute. In that case, the same passages previously shown are applicable with the precaution of replacing the variable $P_{user\_filt}$ with the analogous $H_{user\_filt}$ being calculated as low-pass filtering of the instantaneous beats of the cyclist elaborated through a low-pass filter. Moreover, in this particular application that automatically modulates the motor assistance based on the heartbeat of the cyclist, it is preferable to set the value $K_{feed}$ equal to zero because a reference power cannot be determined, which is suitable to initialize the control system.

Experimental results allowed verifying that the proposed management method allows fully achieving the intended purposes in terms of overcoming the drawbacks of the known art.

Given the principle of the invention, the embodiments and the realization details could be widely varied with respect to what has been described and shown by way of non-limiting example, without for that reason departing from the scope of the invention as defined in the attached claims.

The invention claimed is:

1. A management method for managing the energy range of a rechargeable battery pack of an assisted pedal electrical bicycle including an electrical machine controllable for supplying a torque according to a pedal assistance factor, said torque being summed to the one generated by a cyclist through the pedaling, the management method including the following steps:
   a) a cyclist selecting a route to be traveled by the electrical bicycle starting from an initial position;
   b) obtaining data representative of the altitude profile of the selected route and dividing the route in a plurality of segments each being characterized by a respective altitude parameter;
   c) calculating a value correlated to the maximum percentage of battery pack discharge on the selected route as a function of the altitude profile and of a pedal assistance factor K limit, calculating a value for each segment representative of the percentage of battery pack discharge on the segment as a function of a limit assistance factor K limit associated to each segment based on the altitude parameter associated to the segment; and
   d) starting from the calculation carried out in step c), verifying whether the battery pack has a residual positive charge or not at the end of the route;
   wherein, if following that step d) of verifying it is determined that the battery pack does not have a residual positive charge at the end of the route, then the management method iteratively repeats the steps c) and d) modifying the limit assistance factor K limit based on one or more adjustment curves each allowing to obtain a new limit assistance factor for each segment as a function of the segment slope;
   wherein said adjustment curves are bilinear curves having a saturation towards increasing slope values.

2. The management method according to claim 1, wherein said adjustment curves are defined by the expression:

$$K\_\text{limit} = \text{MAX}(0; \text{MIN}(2.5; \text{IF}(\Delta H \% > 0; 0.3003 * \Delta H \% + 0.5; 0.07 * \Delta H \% + 0.5)) * K\_GIA$$

wherein K_GIA is an adjustment coefficient being variable from a minimum value to a maximum value and ΔH % is the percent slope of a segment.

3. An assisted pedal electrical bicycle including an onboard electronic system adapted and configured to carry out a management method according to claim 1.

4. A management method for managing the energy range of a rechargeable battery pack of an assisted pedal electrical bicycle including an electrical machine controllable for supplying a torque according to a pedal assistance factor, said torque being summed to the one generated by a cyclist through the pedaling, the management method including the following steps:
   a) a cyclist selecting a route to be traveled by the electrical bicycle starting from an initial position;
   b) obtaining data representative of the altitude profile of the selected route and dividing the route in a plurality of segments each being characterized by a respective altitude parameter;
   c) calculating a value correlated to the maximum percentage of battery pack discharge on the selected route as a function of the altitude profile and of a pedal assistance factor K limit, calculating a value for each segment representative of the percentage of battery pack discharge on the segment as a function of a limit assistance factor K limit associated to each segment based on the altitude parameter associated to the segment; and
   d) starting from the calculation carried out in step c), verifying whether the battery pack has a residual positive charge or not at the end of the route;
   wherein, if following that step d) of verifying it is determined that the battery pack does not have a residual positive charge at the end of the route, then the management method iteratively repeats the steps c) and d) modifying the limit assistance factor K limit based on one or more adjustment curves each allowing to obtain a new limit assistance factor for each segment as a function of the segment slope;
   wherein said step c) is carried out by means of an empirically estimated reference curve that correlates a percentage of battery pack discharge per traveled kilometer as a function of the slope.

5. A management method for managing the energy range of a rechargeable battery pack of an assisted pedal electrical bicycle including an electrical machine controllable for supplying a torque according to a pedal assistance factor, said torque being summed to the one generated by a cyclist through the pedaling, the management method including the following steps:
- a) a cyclist selecting a route to be traveled by the electrical bicycle starting from an initial position;
- b) obtaining data representative of the altitude profile of the selected route and dividing the route in a plurality of segments each being characterized by a respective altitude parameter;
- c) calculating a value correlated to the maximum percentage of battery pack discharge on the selected route as a function of the altitude profile and of a pedal assistance factor K limit, calculating a value for each segment representative of the percentage of battery pack discharge on the segment as a function of a limit assistance factor K limit associated to each segment based on the altitude parameter associated to the segment; and
- d) starting from the calculation carried out in step c), verifying whether the battery pack has a residual positive charge or not at the end of the route;

wherein, if following that step d) of verifying it is determined that the battery pack does not have a residual positive charge at the end of the route, then the management method iteratively repeats the steps c) and d) modifying the limit assistance factor K limit based on one or more adjustment curves each allowing to obtain a new limit assistance factor for each segment as a function of the segment slope;

wherein if following said step of verifying it is determined that the battery pack has a residual positive charge at the end of the route, then the management method provides a consent to carry out the assistance based on the limit assistance factor K limit associated to each segment, iteratively carrying out the above-mentioned steps of calculating and verifying in real time and periodically along all the route if necessary, applying adjustment coefficients adapted to guarantee as much as possible that a discharge profile along the route adheres to a profile being calculated in an initial planning step by carrying out the above-mentioned steps a), b), c), and d).

6. A management method for managing the energy range of a rechargeable battery pack of an assisted pedal electrical bicycle including an electrical machine controllable for supplying a torque according to a pedal assistance factor, said torque being summed to the one generated by a cyclist through the pedaling, the management method including the following steps:
- a) a cyclist selecting a route to be traveled by the electrical bicycle starting from an initial position;
- b) obtaining data representative of the altitude profile of the selected route and dividing the route in a plurality of segments each being characterized by a respective altitude parameter;
- c) calculating a value correlated to the maximum percentage of battery pack discharge on the selected route as a function of the altitude profile and of a pedal assistance factor K limit, calculating a value for each segment representative of the percentage of battery pack discharge on the segment as a function of a limit assistance factor K limit associated to each segment based on the altitude parameter associated to the segment; and
- d) starting from the calculation carried out in step c), verifying whether the battery pack has a residual positive charge or not at the end of the route;

wherein, if following that step d) of verifying it is determined that the battery pack does not have a residual positive charge at the end of the route, then the management method iteratively repeats the steps c) and d) modifying the limit assistance factor K limit based on one or more adjustment curves each allowing to obtain a new limit assistance factor for each segment as a function of the segment slope;

wherein the management method for managing the energy range is part of a management method of the operative modes of an assisted pedal electrical bicycle and allows an automatic management mode, the management method of the operative modes also including one or more different operating modes being selectable to establish the pedal assistance factor as a function of the activity type that the cyclist wants to perform, comprising a first operating mode where a pedal assistance factor is constant and/or a second operating mode where the pedal assistance factor is variable as a function of the bicycle velocity and/or a third operating mode where the pedal assistance factor is variable as a function of the torque being applied to the pedals by the cyclist and/or a fourth operating mode in which the pedal assistance factor is variable to keep the power applied to the pedals by the cyclist or the mean value of the cyclist's heartbeat constant.

* * * * *